United States Patent
Zak et al.

[11] Patent Number: 5,183,152
[45] Date of Patent: Feb. 2, 1993

[54] HUMECTANTS IN JOINT COMPOUND CONTAINERS

[75] Inventors: James L. Zak, Cheektowaga; Richard E. Smith, Williamsville, both of N.Y.

[73] Assignee: National Gypsum Company, Dallas, Tex.

[21] Appl. No.: 576,912

[22] Filed: Sep. 4, 1990

[51] Int. Cl.⁵ .............................. B65D 85/84
[52] U.S. Cl. ........................ 206/524.4; 206/447; 206/524.3
[58] Field of Search .............. 206/205, 447, 524.1, 206/524.3, 524.4, 524.6; 383/116

[56] References Cited

U.S. PATENT DOCUMENTS

| | | | |
|---|---|---|---|
| 2,333,023 | 10/1943 | Manor | 206/447 |
| 2,386,440 | 10/1945 | Crocker | 206/524.3 |
| 2,396,633 | 3/1946 | Bernstein | 206/447 |
| 3,099,593 | 7/1963 | Syracuse | 206/447 |
| 3,545,643 | 12/1970 | Higgins | 206/447 |
| 3,648,882 | 3/1972 | Shelton | 206/447 |
| 4,296,859 | 10/1981 | McClinton | 206/447 |
| 4,318,475 | 3/1982 | Robinson | 206/524.3 |
| 4,363,840 | 12/1982 | Roullet et al. | 206/524.3 |
| 4,728,508 | 3/1988 | Hayes et al. | 206/524.1 |

*Primary Examiner*—David T. Fidei
*Attorney, Agent, or Firm*—Laird F. Miller; Robert F. Hause

[57] ABSTRACT

Ready-mix joint compound packaged in a container, the inner surface of which has a thin coating of humectant, such as a glycol, maintaining an improved uniformity of the moisture content of all portions of the ready-mix joint compound contained therein.

7 Claims, 2 Drawing Sheets

HUMECTANTS IN JOINT COMPOUND CONTAINERS

This invention relates to a thin application of a humectant onto the inner surface of a container for an aqueous slurry, such as a drywall joint compound, prior to filling the container with the aqueous slurry.

BACKGROUND OF THE INVENTION

Drywall joint compounds are sold in a dry powder form to be mixed with water by the user just prior to use, and also in ready-mixed aqueous slurry form, requiring only a minimum of preparation by the user prior to use. A problem exists in packaging the ready-mixed joint compounds in that portions of the ready-mixed compound which are in contact with the inner surface of a package tend to give up part of the water, which alters the character of that drier part of the joint compound.

One form of packaging of ready-mixed joint compounds involves inserting a polyethylene film bag into a substantially cubic corrugated cardboard box, sleeving the top of the bag by folding it back onto the outside of the box, and squirting the container full of ready-mixed joint compound, commonly referred to as "ready-mix". The top of the polyethylene bag is then closed and a wire tie keeps the bag airtight. Flaps, forming the cardboard box top are then folded down over the bag, and the box is sealed shut.

In filling the polyethylene bag and closing it, small amounts of the ready-mix will commonly become spattered or otherwise stuck onto an upper portion of the bag that is folded over the top of the ready-mix, but not in complete contact with the ready-mix. These small amounts tend to dry out prior to the ultimate user opening the box, and when the ultimate user then opens the box and the polyethylene bag, these dried out small amounts become loosened and fall into the ready-mix, contaminating the ready-mix to an even greater extent than the somewhat dried parts of the main body of the ready-mix which are in contact with the inner surface of the package.

SUMMARY OF THE INVENTION

The present invention consists of a method wherein a humectant, such as glycol, is sprayed onto the inner surface of a container for aqueous slurries such as ready-mix joint compounds, and to an improved container for aqueous slurries which have a thin coating of a humectant on the container inner surface.

It is an object of the present invention to provide an improved package for aqueous slurries wherein a thin coating of humectant is disposed on the entire inner surface of the package which is subject to coming into contact with the aqueous slurry.

It is a further object of the invention to provide a filled and sealed package of ready-mix joint compound consisting of a package which has a humectant on the surface of the package which is in contact with the joint compound.

It is a still further object of the invention to provide a novel method of preparing a package for use in the containment of aqueous slurries, and of preparing improved filled packages of ready-mix joint compound.

BRIEF DESCRIPTION OF THE DRAWINGS

These and other objects and advantages of the invention will be more readily apparent when considered in relation to the preferred embodiments as set forth in the specification and shown in the drawings in which.

DESCRIPTION OF THE PREFERRED EMBODIMENTS

Figure 1:
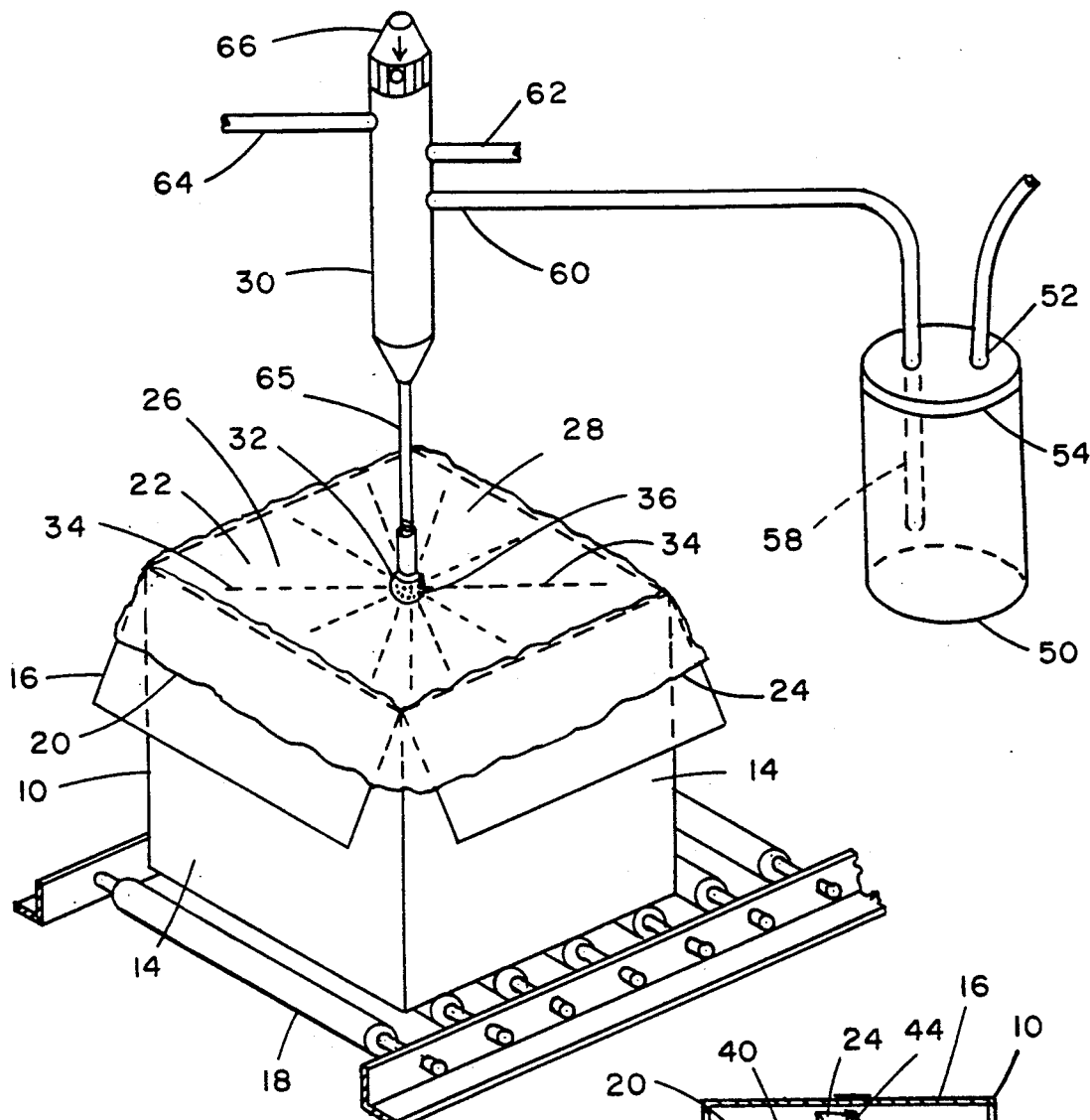
FIG. 1 is an isometric view of a corrugated cardboard box with a polyethylene film bag inserted therein, being sprayed with a humectant, prior to the bag being filled with ready-mix joint compound.

Referring to FIG. 1, there is shown a corrugated cardboard box 10, about 10"×10"×10", having a bottom 12, four sides 14 and top flaps 16 suitable for closing and sealing the box 10. Box 10, as shown, is located on a roller conveyor 18. Inserted into box 10 is a polyethylene film bag 20, a major lower portion 22 being within box 10, generally conforming to the inner shape of box 10, whereby the box 10 functions as a relatively rigid outer shell for supporting the bag 20 and any material placed therein. A minor upper portion 24 of bag 20 is outside box 10, folded outwardly and downwardly over flaps 16, whereby the lower portion 22 of bag 20 is held in an open and accessible condition, thoroughly exposing the entire inner surface 26 of the lower portion 22 of bag 20, through the top opening 28.

In accordance with the preferred form of the invention, a liquid spray gun 30 with a downwardly directed spherical spray pattern tip 32 is shown disposed in top opening 28, just inside the lower portion 22 of bag 20, with a large plurality of droplets 34 of humectant being sprayed onto the entire inner surface of the bag lower portion 22. The spherical tip 32 has a large plurality of openings 36, directing said humectant droplets 34 horizontally in all horizontal directions and downwardly in all downwardly directions and outwardly in all directions therebetween, in order to apply a continuous thin humectant coating 38 throughout the inner surface 26 of the lower portion 22 of bag 20.

This spray application of a humectant coating 38, onto the inner surface 26, is preferably performed immediately after the bag 20 is inserted into the box 10, as the bag 20 and box 10 are progressing along a conveyor 18, prior to placing an aqueous slurry 40 into the lower portion 22 of the bag 20. Means, not shown, are provided to move the spray gun 30 downwardly to a spraying position and then upwardly to permit the box 10 to be moved along the conveyor 18.

Figure 2:
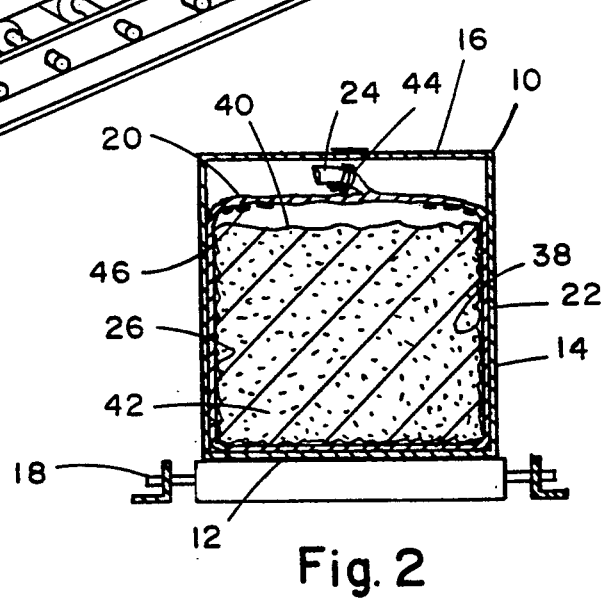
FIG. 2 is a sectional end view of a corrugated cardboard box with a polyethylene film bag therein, internally coated with a humectant and filled almost to the closed top of the bag with ready-mix joint compound.

FIG. 2 shows box 10, still disposed on roller conveyor 18, after the bag 20 has had a body 42 of ready-mix joint compound aqueous slurry 40 placed therein, and the bag upper portion 24 has been gathered tightly together and sealed with a wire tie 44. The thin bag 20 and the extremely thin humectant coating 38 are shown in exaggerated thicknesses in FIG. 2. Also shown in FIG. 2 are a few small globs 46 of joint compound slurry 40 that splashed on the inner surface 26 of lower portion 22 above the part of inner surface 26 in contact with the main body 40 of joint compound slurry 42.

The presence of the humectant coating 38 on the inner surface 26 of the lower portion 22 of bag 20, throughout all areas of contact between bag 20 and joint compound slurry 40, reduces very substantially any decrease in the water content of those portions of the main body 42 of aqueous slurry 40 located near the inner surface 26 and of the globs 46 of aqueous slurry 40 stuck on the inner surface 26.

Figure 3:
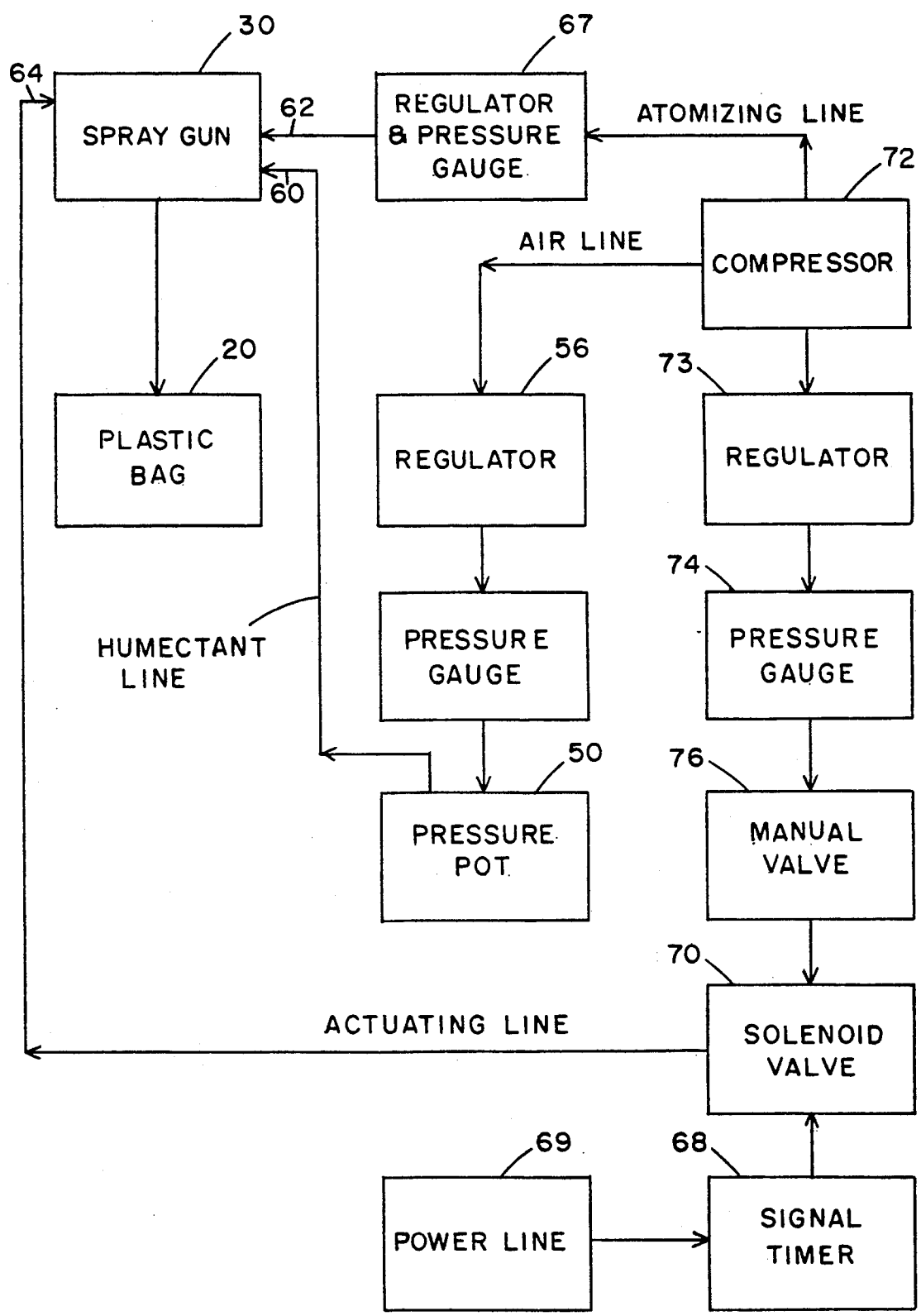
FIG. 3, is a flow diagram of the complete apparatus for spraying humectant, as partially shown in FIG. 1.

FIGS. 1 and 3 show, pictorially and diagrammatically, respectively, the apparatus for producing the large plurality of droplets 34. A pressure pot 50 is filled with humectant and air is constantly supplied through the air inlet 52 in the pressure pot lid 54. A pressure control regulator 56 on the air inlet 52 maintains a constant air pressure of about 25 psi in the pressure pot 50.

A dip tube 58 extends from near the bottom of the pressure pot 50 up through the lid 54 and to the humectant inlet 60 of spray gun 30. Spray gun 30 is preferably a Paasche A-JU automatic spray gun, manufactured by Paasche Airbrush Company. Spray gun 30, in addition to humectant inlet 60, has an atomizing air inlet 62 and an actuating air inlet 64. At the lower part of spray gun 30 is an extension pipe 65, onto which spray pattern tip 32 is screwed.

On the upper end of spray gun 30 is a fluid adjusting nut 66 with settings from zero to 90. The fluid adjusting nut 66 controls the stroke of a needle (not shown) which thus regulates the flow of the material through the spherical tip 32. Air is constantly supplied, through a regulator and pressure gauge 67, at about 25 psi, to the atomizing air inlet 62.

Air at about 50 psi is supplied to the actuating air inlet 64, in very short bursts, the length of time of each burst being very closely controlled by a signal timer 68, preferably an Eagle Signal Programmable Digital Timer, LX 240 Series, capable of controlling the duration of a burst of air to tenths of seconds. The signal timer 68, operating from a 110 V. power line 69, actuates a solenoid valve 70, which, when opened, allows 50 psi air from a source 72 to proceed to the actuating air inlet 64. A pressure regulator 73, an air pressure gauge 74 and a manual valve 76 are also shown between the high pressure air source 72 and the solenoid valve 70.

The amount of humectant sprayed into each bag 20 is controlled by both the timer 68 and the fluid adjusting nut 66 which controls the stroke of the needle (not shown). In the preferred form, about 5 grams, or from about 2 to 10 grams, of ethylene glycol per bag 20 is used; bag 20 is constructed to contain about three-and-a-half gallons of slurry 40 in the lower portion 22, and the spraying of the glycol takes about one or two seconds.

The preferred humectants are glycols, such as ethylene glycol or a mixture of ethylene glycol with a minor amount of water. Also, diethylene glycol or a propylene glycol, when substituted for the ethylene glycol in a pure form or mixed with water, have been found to be suitable in accordance with the invention.

When the box 10, filled with aqueous joint compound slurry 40, is delivered to a customer, the customer will be able to empty the contents more easily and completely than a similar box not treated with a coating of humectant in the bag 20, and the joint compound slurry 40 will be of a more uniform condition, relatively free of dried out or partially dried out portions or globs.

Having completed a detailed description of the preferred embodiments of our invention so that those skilled in the art may practice the same, we contemplate that variations may be made without departing from the essence of the invention.

We claim:

1. A container comprising watertight walls forming a complete enclosed watertight container and a thin layer of a humectant disposed on substantially all of the inner surfaces of said container as are likely to contact any aqueous slurry contents placed in said container, wherein said watertight walls are a plastic film.

2. A container as defined in claim 1 wherein said container further includes an outer relatively rigid material suitable for containing said plastic film when said container is filled with an aqueous slurry.

3. A container as defined in claim 1 wherein said outer rigid material is corrugated cardboard and said plastic film is a polyethylene bag.

4. A container comprising watertight walls forming a complete enclosed watertight container and a thin layer of a humectant disposed on substantially all of the inner surfaces of said container as are likely to contact any aqueous slurry contents placed in said container, which said container contains a ready-mix joint compound.

5. A container as defined in claim 4 wherein small globs of said joint compound, splashed on said inner surface during the filling of the container, are being kept relatively moist by said humectant.

6. An aqueous joint compound slurry and relatively airtight means containing said slurry, said means comprising a thin waterproof layer and a coating of humectant on an inner surface of said waterproof layer, said slurry being contained within said containing means with said humectant coating being disposed on substantially all portions of said inner surface in contact with any of said aqueous joint compound slurry, whereby said slurry is in contact only with said humectant coating and is thereby maintained in a relatively uniform water content condition throughout.

7. The combination of claim 6 wherein said humectant coating is a glycol coating of about 2 to 10 grams per ten-inch cube of slurry.

* * * * *